US009878755B2

(12) United States Patent
Rouland et al.

(10) Patent No.: US 9,878,755 B2
(45) Date of Patent: Jan. 30, 2018

(54) MOTORCYCLE SEAT AND METHOD OF MAKING SAME

(71) Applicant: HIGH END SEATING SOLUTIONS, Santa Ana, CA (US)

(72) Inventors: Lars Rouland, Laguna Nigel, CA (US); Anthony Eric Sprouse, II, O'Fallon, IL (US); Steven Ross Peyton, Belleville, IL (US)

(73) Assignee: HIGH END SEATING SOLUTIONS, LLC, Santa Ana, CA (US)

( * ) Notice: Subject to any disclaimer, the term of this patent is extended or adjusted under 35 U.S.C. 154(b) by 0 days.

(21) Appl. No.: 14/237,479

(22) PCT Filed: Nov. 25, 2013

(86) PCT No.: PCT/US2013/071572
§ 371 (c)(1),
(2) Date: Feb. 6, 2014

(87) PCT Pub. No.: WO2014/105316
PCT Pub. Date: Jul. 3, 2014

(65) Prior Publication Data
US 2015/0298753 A1    Oct. 22, 2015

Related U.S. Application Data

(60) Provisional application No. 61/746,302, filed on Dec. 27, 2012.

(51) Int. Cl.
B62J 1/26    (2006.01)
B62J 1/12    (2006.01)
(Continued)

(52) U.S. Cl.
CPC ............. *B62J 1/26* (2013.01); *A61G 5/1043* (2013.01); *B62J 1/12* (2013.01); *B62J 1/22* (2013.01)

(58) Field of Classification Search
CPC ................ B62J 1/00; B62J 1/26; A47C 4/54
(Continued)

(56) References Cited

U.S. PATENT DOCUMENTS 594,451  A  *  11/1897  Wheeler ................. B62J 1/002
                                                    297/202
2,332,847  A     10/1943  Franke
(Continued)

FOREIGN PATENT DOCUMENTS

CA    2214760    7/1997
CA    2273357    6/1998
(Continued)

OTHER PUBLICATIONS

Search Report of corresponding application PCT/US2013/071572 dated Mar. 5, 2014.
(Continued)

*Primary Examiner* — David E Allred
(74) *Attorney, Agent, or Firm* — Roeder & Broder LLP; James P. Broder

(57) ABSTRACT

A seat comprising a base pan defining cutouts positioned under a seating area for a seated user, a resilient membrane over the cutouts, a cushion on the base pan, at least one air cell pad on the cushion at the seating area and a cover.

27 Claims, 2 Drawing Sheets

(51) Int. Cl.
*A61G 5/10* (2006.01)
*B62J 1/22* (2006.01)

(58) Field of Classification Search
USPC .................. 297/195.1, 200, 199, 452.41
See application file for complete search history.

(56) References Cited

U.S. PATENT DOCUMENTS

| | | | |
|---|---|---|---|
| 4,012,072 A | 3/1977 | Hansen | |
| 4,451,083 A | 5/1984 | Marchello | |
| 4,779,924 A | 10/1988 | Rudel | |
| 5,108,076 A * | 4/1992 | Chiarella | B62J 1/18 |
| | | | 297/214 |
| 5,165,752 A * | 11/1992 | Terry | B62J 1/18 |
| | | | 297/202 |
| 5,244,251 A * | 9/1993 | Bourla | 297/199 |
| 5,286,082 A * | 2/1994 | Hanson | B62J 1/007 |
| | | | 297/195.1 |
| 5,348,369 A | 9/1994 | Yu | |
| 5,353,734 A * | 10/1994 | Tani | 114/363 |
| 5,356,205 A * | 10/1994 | Calvert | B62J 1/002 |
| | | | 280/288.4 |
| 5,419,612 A * | 5/1995 | Rassekhi | 297/200 |
| 5,461,741 A | 10/1995 | Graebe | |
| 5,658,050 A | 8/1997 | Lorbiecki | |
| 5,711,573 A * | 1/1998 | Daniels et al. | 297/199 |
| 5,738,406 A * | 4/1998 | Deus | 297/200 |
| 5,769,488 A * | 6/1998 | Daniels et al. | 297/199 |
| 5,904,396 A * | 5/1999 | Yates | B62J 1/002 |
| | | | 297/195.1 |
| 5,975,629 A | 11/1999 | Lorbiecki | |
| 6,007,149 A | 12/1999 | Yates | |
| 6,022,073 A | 2/2000 | Yates | |
| 6,027,166 A | 2/2000 | Yates | |
| 6,106,059 A * | 8/2000 | Minkow | B62J 1/002 |
| | | | 297/202 |
| 6,135,550 A | 10/2000 | Tucho | |
| 6,136,426 A * | 10/2000 | Bigolin | B62J 1/26 |
| | | | 264/271.1 |
| 6,231,122 B1 * | 5/2001 | Goldstein | B62J 1/00 |
| | | | 297/195.1 |
| 6,257,662 B1 * | 7/2001 | Yates | B62J 1/00 |
| | | | 297/202 |
| 6,345,865 B1 * | 2/2002 | Ashida et al. | 297/195.1 |
| 6,450,572 B1 * | 9/2002 | Kuipers | B62J 1/00 |
| | | | 297/195.1 |
| 6,598,251 B2 | 7/2003 | Habboub et al. | |
| 6,860,551 B1 * | 3/2005 | Chi | B62J 1/26 |
| | | | 297/199 |
| 6,860,552 B1 * | 3/2005 | Bigolin | 297/214 |
| 6,886,887 B2 * | 5/2005 | Yu | B62J 1/26 |
| | | | 297/195.1 |
| 6,942,291 B2 * | 9/2005 | Yu | 297/200 |
| 7,055,900 B2 * | 6/2006 | Losio | B62J 1/002 |
| | | | 297/180.1 |
| 7,121,622 B1 * | 10/2006 | Mendez | B62J 1/00 |
| | | | 297/201 |
| 7,350,251 B2 | 4/2008 | Fraser et al. | |
| 7,604,292 B1 | 10/2009 | Reading | |
| 7,628,451 B2 * | 12/2009 | Chuang | B62J 1/005 |
| | | | 297/201 |
| 7,648,198 B1 | 1/2010 | Matsler | |
| 7,661,757 B2 * | 2/2010 | Chuang | B62J 1/002 |
| | | | 297/202 |
| 7,681,265 B2 | 3/2010 | Fraser | |
| 7,699,392 B2 * | 4/2010 | Chuang | B62J 1/26 |
| | | | 297/202 |
| 8,047,604 B2 * | 11/2011 | Chuang | B62J 1/005 |
| | | | 297/201 |
| 8,297,696 B2 * | 10/2012 | Chuang | B62J 1/005 |
| | | | 297/199 |
| D673,785 S | 1/2013 | Sprouse, II | |
| 8,973,986 B1 * | 3/2015 | Marceleno | B62J 1/007 |
| | | | 297/199 |
| 9,132,874 B2 * | 9/2015 | Sam | B62J 1/22 |
| 2003/0041379 A1 | 3/2003 | Habboub et al. | |
| 2003/0205920 A1 | 11/2003 | Sprouse, II et al. | |
| 2004/0183343 A1 * | 9/2004 | Probst | 297/195.1 |
| 2005/0121953 A1 | 6/2005 | Sprouse, II | |
| 2008/0196166 A1 | 8/2008 | Fraser | |
| 2012/0292958 A1 | 11/2012 | Sprouse, II | |
| 2015/0175229 A1 * | 6/2015 | Chiba | B62J 1/12 |
| | | | 297/452.18 |
| 2015/0183476 A1 * | 7/2015 | Chiba | B62J 1/12 |
| | | | 297/214 |

FOREIGN PATENT DOCUMENTS

| | | |
|---|---|---|
| JP | 61075756 | 5/1986 |
| JP | H06344964 | 12/1994 |
| JP | 2003054459 | 2/2003 |
| JP | 4093284 | 6/2008 |
| WO | 9408839 A1 | 4/1994 |
| WO | 9829010 A1 | 7/1998 |
| WO | 2009124105 A2 | 10/2009 |

OTHER PUBLICATIONS

Written Opinion of corresponding application PCT/US2013/071572 dated Mar. 5, 2014.

Supplementary European Search Report and Opinion, European Patent Office, dated Mar. 28, 2017, High End Seating Solutions LLC, European application No. EP 13 86 9329.6 (related application).

* cited by examiner

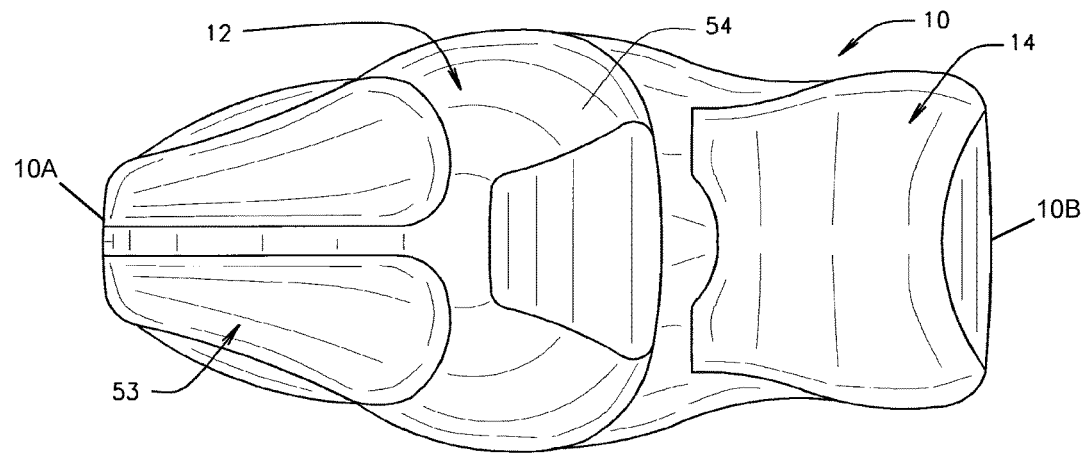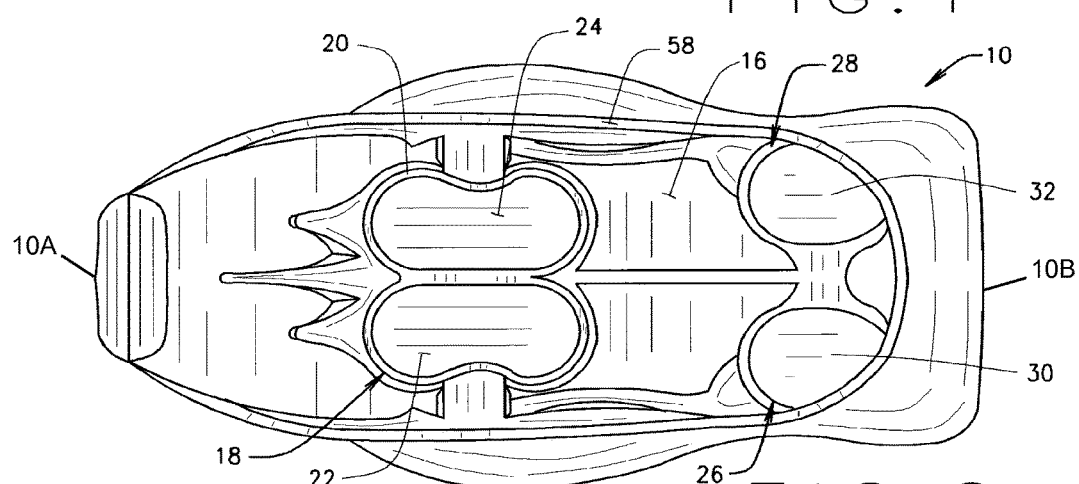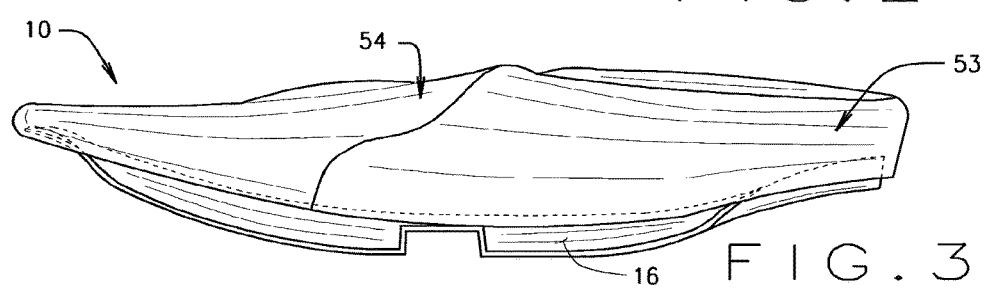

MOTORCYCLE SEAT AND METHOD OF MAKING SAME

CROSS REFERENCE TO RELATED APPLICATIONS

This application is the United States National Stage under 35 U.S.C. § 371 of International Application Serial No. PCT/US2013/071572, having an International filing date of Nov. 25, 2013, which claims the benefit of U.S. provisional application Ser. No. 61/746,302, filed Dec. 27, 2012, which is incorporated herein by reference.

STATEMENT REGARDING FEDERALLY SPONSORED RESEARCH OR DEVELOPMENT

Not Applicable.

BACKGROUND OF THE INVENTION

The application relates generally to seating and, more specifically to a motorcycle seat that relieves pressure on various points of the rider's anatomy, absorbs road shock and improves ventilation at the interface between the rider and the cushion. Although the principles disclosed herein apply well to motorcycle seats, it will be understood that they can be applied to any seat where these characteristics are desired.

Motorcycle seats or saddles are well known. In general, a motorcycle seat is constructed to support the seated rider's buttocks and, depending upon the size and style, a portion of the upper thigh. Most motorcycle seats or saddles are constructed from firm support padding or foam with a leather or vinyl covering. In use the rider straddles the seat, thereby exposing the inner thigh, buttocks, ischial areas, and genital area to pressure and vibration. Due to the typical construction of a seat, the rider can bottom out on a firm seat on bumpy surfaces. Also, in warm weather there can be a buildup of moisture or heat which could, over long periods of time, lead to discomfort, wetness and possibly skin breakdown. If the rider is seated for long periods of time he can develop discomfort, soreness and even numbness in these regions of the anatomy due to pressure and vibration on the nerves.

It would be advantageous, therefore, to have a seat that provides support while relieving pressure on sensitive areas of the anatomy and reducing heat and moisture buildup.

SUMMARY OF THE INVENTION

In one aspect, a motorcycle seat includes a pan, a foam cushion layer adjacent the pan and an air pad insert in the foam layer at the seating area. The air cell pad comprises a base, with an array of upstanding cells across the base. In one aspect, the cells are inflatable air cells that are interconnected such that pressure is spread across a wider area to reduce pressure points. The seat can comprise an operator's seat and a pillion seat. The pan under the seating areas includes cut-outs at the approximate ischial areas of the seated rider. The cut-outs can include a resilient, pliable membrane or diaphragm. The seat includes a cover over the foam cushion layer, the air pad insert, and the pan. The seat can be constructed from a moisture wicking or spacer mesh fabric and is secured over the seat by a perimeter elastic margin.

The cutouts in the pan provide pressure relief for the seated rider, particularly when riding for a long time. Moreover, the cut-outs reduce hard bottoming-out on bumpy surfaces. Also, the air pads in the foam cushion and the shock absorbing cut-outs cooperate to make a low profile seat, providing greater stability for the rider.

The air cell pad can be constructed in accordance with the principles of co-pending patent application Ser. No. 13/309, 767, filed Dec. 2, 2011, which is incorporated herein by reference. Briefly stated, the air cell pad may include air flow pathways between the cells that allow air to circulate among the cells to disperse heat and moisture. There is a midline pathway that is positioned under the perineum of the rider to provide pressure relief to the perineum and prostate of the male rider. The midline pathway also provides relief to the coccyx of the seated rider.

In one aspect, the insert is fabricated from a dip molded neoprene to enhance the support characteristics. In other aspects, the insert could be vacuum molded from a thermoplastic material as well.

In one aspect a pad other than an air cell pad is employed in the foam cushion layer.

In one aspect no additional pad is employed on the foam cushion layer

In one aspect, the seat cover includes a portion of the top and side walls of the cover constructed from a material having two-way stretch characteristics. Also, the cover includes seating areas comprised of a moisture repellant spacer fabric that allows airflow and wicking characteristics to reduce moisture build-up at the interface of the rider and the seat, particularly as the motorcycle is moving.

In another aspect, a plain vinyl or leather cover can be used.

BRIEF DESCRIPTION OF THE DRAWINGS

FIG. 1 is a top plan view of one aspect of a seat
FIG. 2 is a bottom plan view thereof;
FIG. 3 is a left side elevational view thereof.

DETAILED DESCRIPTION

Figure 4:
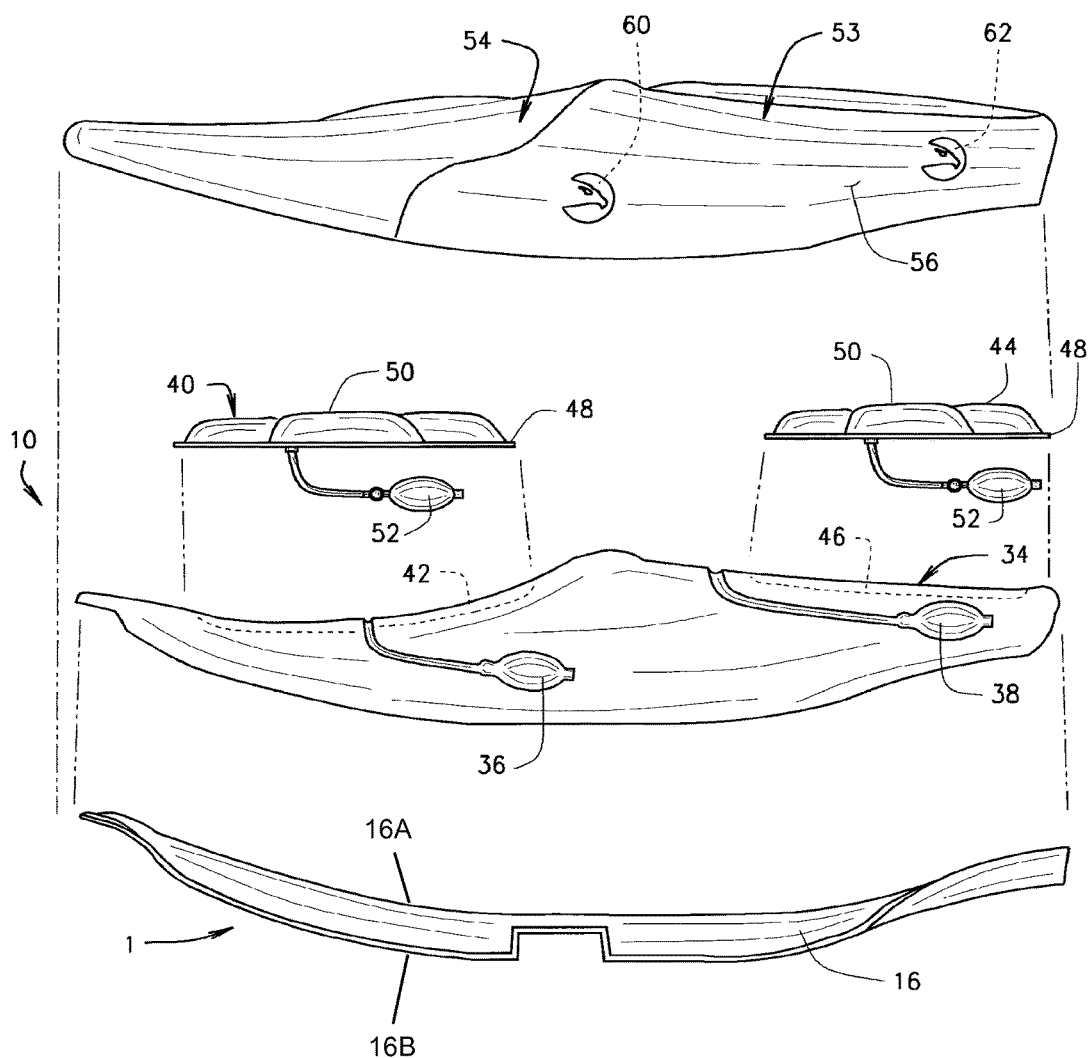
FIG. 4 an exploded view thereof.

One aspect of a seat is indicated generally by reference number 10 in the drawings. Although illustrated as a motorcycle seat, it is understood that the principles of the disclosure are applicable to other types of seats. As illustrated, seat 10 includes an anteriorly positioned seat front 10A and a posteriorly positioned seat rear 10B. Seat 10, as shown, includes two seating areas for riders, a forward seating area 12 for an operator and a rear seating area 14 or pillion seat for a passenger. It will be appreciated that the principles disclosed herein also apply to a seat that includes only one seating area for an operator.

Seat 10 includes a base or pan 16 that is attached to the frame of a motorcycle in any conventional manner. As shown most clearly in FIG. 4, the pan 16 includes a first surface 16A, e.g., an upper surface, and an opposed second surface 16B, e.g., a lower surface. Pan 16 comprises a light weight, durable, but substantially rigid material such as fiberglass, plastic, aluminum or any other suitable material. Pan 16 includes a pair of forward cutouts 18 and 20 that are located so as to be positioned under the forward seating area 12, particularly under the buttocks and ischial bones of the seated operator. There may be thin, flexible diaphragms, such as rubber diaphragms 22 and 24, extending over, but not within cutouts 18 and 20. Similarly, in the illustrated seat there are rear cutouts 26 and 28 in pan 16 positioned under the rear seating area 14 and particularly under the buttocks and ischial bones of the seated passenger. In one aspect, diaphragms 30, 32, are positioned to extend over, but not within, the rear cutouts 26 and 28, respectively. In this embodiment, the forward cutouts 18, 20 and the rear cutouts 26, 28 are each devoid of any other structures.

There is a foam cushion 34 positioned on pan 16. Cushion 34 is complementary in configuration to the pan 16 and fits over the pan 16 and is secured to the pan 16 in any acceptable manner, including gluing, screws, rivets or other attachment means. As seen in FIG. 4, cushion 34 has a pair of cutouts or indentations 36, 38 in a peripheral side wall complementary in configuration to bulb pumps and hoses, as will be explained below. Cushion 34 comprises resilient, compressible foam, such as high density foam that has shock absorbing characteristics.

An inflatable air cell cushion or air pad 40 is positioned in a recess 42 in foam cushion 34 at the forward seating area 12. Similarly, there is an inflatable air cell cushion or air pad 44 or pillion cushion positioned in a recess 46 in foam cushion 34 at the rear seating area 14. Although the respective air pads 40, 44 may have different peripheral configurations, they have similar operative elements. For example, each air pad 40, 44 includes a base 48 with a plurality of upstanding air inflation cells 50 arranged in an array on the base 48. In one aspect, cells 50 are inflatable air cells and are generally hollow open-bottomed cells connected through base 48. Because cells 50 are interconnected by fluid flow channels, internal pressure is equalized among all the inflated cells 50 when a rider sits on an inflated cushion so as to spread the restoring force over a greater area. Hence, the design reduces pressure in discrete areas of the anatomy. Each air pad 40, 44 can include an air pump, such as bulb pumps 52 which can nest in indentations 36, 38 in the side of the foam cushion 34. However, any pump apparatus will work. In one aspect, air pads 40, 44 are dip molded from neoprene, as disclosed in U.S. Pat. No. 4,541,136, which is incorporated herein by reference.

In one aspect of the cushion 34, air pad 40 can have a perimeter configuration substantially similar to the outline of buttocks of a seated motorcycle rider and can be constructed in accordance with the principles of co-pending U.S. patent application Ser. No. 13/309,767, filed Dec. 2, 2011 or U.S. Pat. No. Des. 672,569, both of which are incorporated herein by reference. Rear air pad 44 can have a peripheral configuration as shown in U.S. Pat. Des. 673,785, which is incorporated herein by reference. However, any configuration or construction is within the scope of the appended claims.

One skilled in the art will recognize that other types of pads, such as foam or gel pads or foam or gel filled cells, are within the scope of the invention. Moreover, the cells can be combinations of different cells, such as combinations of inflatable air cells, foam cells or gel filled cells as desired for modification of the support characteristics of the cushion. It will be appreciated that in other aspects, foam cushion 34 can be configured to use without any pad.

Seat 10 includes a cover 53. Cover 53 has a peripheral configuration complementary to the configuration of foam cushion 34. As seen in FIG. 2, cover 53 is configured to define the seating areas and give a molded or contoured appearance. Cover 53 has a top surface 54 and a circumferential side wall 56. Top surface 54 can comprise a spacer fabric that defines the respective seating areas 12 and 14 and allows air circulation under the riders and reduces moisture buildup. The material can be moisture repellant as well. Peripheral side wall 56 can comprise a vinyl or leather or stretchy mesh material or a perforated or mesh fabric material. There is a band of elastic 58 around the bottom of the cover 53 that allows the cover 53 to be installed over the seat components. There are openings or other specific areas 60, 62 that allow access to the bulb pumps 52 by seated riders.

It will be understood that other types of covers 53 may be employed, such as vinyl or leather.

Seat 10 has enhanced shock absorbing characteristics. The cushion 34 provides a more comfortable ride while reducing pressure. The operator and/or the passenger mount their respective seating areas 12, 14 and each can access the bulb pump 52 of the air pad 40, 44 and inflate the air pad 40, 44 for optimum comfort. In another aspect, the air pads 40, 44 can be pre-inflated to an optimum level and sealed to maintain that level without pumping or adjustment. The cutouts in pan 16 under the buttocks, particularly cutouts including rubber diaphragms, enhance comfort and prevent bottoming out when riding over rough surfaces. The air pads 40, 44 are recessed in foam cushion 34 and provide excellent weight distribution and distribution of restoring forces. Moreover, the foam cushion 34 has vibration absorption qualities. Since the air pads 40, 44 are recessed in the foam cushion 34, the seat 10 has a relatively low profile and provides better stability and handling of the motorcycle.

Although disclosed seat is described as a motorcycle seat for simplicity and clarity, it will be understood that the various elements of the seat can be employed in other environments to enhance comfort. For example, seats for other vehicles such as automobiles or ATVs can include the disclosed components. The seat can be used with wheelchairs or medical support surfaces. Various changes and modification may be made in seat of the present disclosure without departing from the scope of the invention.

The invention claimed is:

1. A vehicle seat having at least one forward seating area for a seated user and at least one rearward seating area for another seated user, the vehicle seat comprising:
 a pan that is formed from a rigid material and that is configured for attachment to a frame element of a vehicle, said pan defining at least four cutouts formed into the rigid material, wherein at least two of the cutouts are spaced apart from each other under the forward and rearward seating areas, respectively, at least two of the cutouts are under the forward seating area and at least two of the cutouts are under the rearward seating area, the two cutouts under each of the forward seating area and the rearward seating area are spaced apart from each other in a side-by-side direction that is transverse to a forward and rearward direction;
 at least one resilient membrane positioned over the four cutouts;
 a cushion supported on the pan, the resilient membrane disposed between the pan and a cushion, wherein the cushion comprises a laterally extending ridge between and protruding upward relative to the forward and rearward seating areas; and;
 at least one forward cellular pad on the cushion at the forward seating area and at least one rearward cellular pad on the cushion at the rearward seating area, each of the forward and rearward cellular pads comprising at least one fluid-filled bladder; and
 a cover over said pan, cushion and cellular pad.

2. The vehicle seat of claim 1 wherein the cellular pad are inflatable air pads.

3. The vehicle seat of claim 2 wherein the inflatable air pads further comprise air pumps.

4. The vehicle seat of claim 3 wherein the cushion includes indentations, and wherein the air pumps are positioned substantially within the indentations.

5. The vehicle seat of claim 2 wherein the cushion includes recesses, and wherein the inflatable air pads are positioned substantially within the recesses.

6. The vehicle seat of claim 1 wherein the cutouts form openings that are devoid of structural elements.

7. A vehicle seat for a vehicle having a vehicle frame, the vehicle seat comprising:
   a rigid pan that is formed from a rigid material and that is configured to be coupled to the vehicle frame, the pan including a first surface, an opposed second surface, and a first cutout and a second cutout that are formed into the rigid material in spaced apart relation to each other, wherein at least a portion of the first cutout is positioned more proximate to a seat front of the vehicle seat than the second cutout, the pan further including a third cutout that is positioned proximate to yet spaced apart from the first cutout in a side-by-side direction that is transverse to a front and rear direction, and a fourth cutout that is positioned proximate to yet spaced apart from the second cutout in a side-by-side direction that is transverse to the front and rear direction; and
   at least one resilient membrane positioned over and engaging the first surface of the rigid pan at the first, second, third, and fourth cutouts; and
   a cushion that is positioned relative to the pan so that the first surface of the pan is positioned substantially between the cushion and the second surface of the pan;
   wherein the vehicle seat comprises a first seating area at a forward portion of the cushion configured for supporting a first seated user and a second seating area at a rearward portion of the cushion configured for supporting a second seated user, wherein the forward portion of the cushion overlies the first and third cutouts and the rearward portion of the cushion overlies the second and fourth cutouts.

8. The vehicle seat of claim 7 wherein the entire first cutout is positioned more proximate to the seat front than the second cutout.

9. The vehicle seat of claim 7 further comprising a cellular pad that is positioned on the cushion.

10. The vehicle seat of claim 9 wherein the cellular pad includes an array of upstanding inflatable air cells.

11. The vehicle seat of claim 10 wherein at least some of the array of upstanding air cells are in fluid communication with each other such that inflation pressure is equalized among the at least some of the array of upstanding air cells.

12. The vehicle seat of claim 10 wherein the cushion includes a recess, and wherein the cellular pad is positioned substantially within the recess.

13. The vehicle seat of claim 7 further comprising a first resilient membrane that is positioned over the first cutout, and a second resilient membrane that is positioned over the second cutout.

14. The vehicle seat of claim 13 further comprising a third resilient membrane that is positioned over, but not within the third cutout, and a fourth resilient membrane that is positioned over, but not within the fourth cutout.

15. The vehicle seat of claim 13 wherein at least one of the first resilient membrane and the second resilient membrane is positioned substantially between the pan and the cushion.

16. The vehicle seat of claim 7 wherein the first cutout and the second cutout form respective openings that are devoid of structural elements.

17. The vehicle seat of claim 16 wherein the third cutout and the fourth cutout form respective openings that are devoid of structural elements.

18. The vehicle seat of claim 7 further comprising a cover that is positioned over the pan and the cushion.

19. A vehicle seat for a vehicle having a vehicle frame, the vehicle seat having a forward seating area for at least one seated rider and at least one rearward seating area for another seated rider, the vehicle seat comprising:
   a rigid pan that is configured to be coupled to the vehicle frame, the pan including a first surface, an opposed second surface, and at least four cutouts, wherein at least two of the cutouts are spaced apart from each other under the forward and rearward seating areas, respectively, at least two of the cutouts are under the forward seating area and at least two of the cutouts are under the rearward seating area, the two cutouts under each of the forward seating area and the rearward seating area are spaced apart from each other in a side-by-side direction that is transverse to a forward and rearward direction;
   at least one resilient membrane positioned over and engaging the first surface of the rigid pan at the four cutouts; and
   a cushion that is positioned relative to the pan such that the first surface of the pan is positioned substantially between the cushion and the second surface of the pan.

20. The vehicle seat of claim 19 wherein the pan includes a plurality of cutouts, including the first, second, third, and fourth cutouts, wherein the plurality of cutouts are positioned under the seating areas, and wherein each of the plurality of cutouts forms a respective opening that is devoid of structural elements.

21. The vehicle seat of claim 19 further comprising a cellular pad that is positioned on the cushion.

22. The vehicle seat of claim 21 wherein the cellular pad includes an array of upstanding inflatable air cells.

23. The vehicle seat of claim 22 wherein at least some of the array of upstanding air cells are in fluid communication with each other such that inflation pressure is equalized among the at least some of the array of upstanding air cells.

24. The vehicle seat of claim 21 wherein the cushion includes a recess, and wherein the cellular pad is positioned substantially within the recess.

25. The vehicle seat of claim 19 further comprising a resilient membrane that is positioned over the first cutout.

26. The vehicle seat of claim 25 wherein the resilient membrane is positioned substantially between the pan and the cushion.

27. The vehicle seat of claim 19 further comprising a cover that is positioned over the pan and the cushion.

* * * * *